Patented Mar. 29, 1938

2,112,403

UNITED STATES PATENT OFFICE 2,112,403

AZO DYESTUFFS

Hans Krzikalla, Ludwigshafen-on-the-Rhine, Bernd Eistert, Mannheim, Joachim Mueller, Ludwigshafen - on - the - Rhine, and Alfred Thurm, Dessau, Germany, assignors to General Aniline Works, Inc., New York, N. Y., a corporation of Delaware No Drawing. Application August 1, 1935, Serial No. 34,292. In Germany August 16, 1934

6 Claims. (Cl. 260—95)

The present invention relates to new azo dyestuffs.

We have found that valuable azo dyestuffs which are soluble in organic solvents are obtained by coupling the diazo compound of an ortho-nitraniline which contains no groups rendering it soluble in water, with a 2.3-hydroxynaphthoic acid amide of the general formula

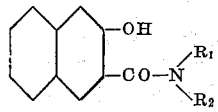

wherein $R_1$ stands for an alkyl group containing up to 5 carbon atoms and $R_2$ stands for hydrogen, an alkyl group containing up to 5 carbon atoms, an aralkyl group, a cycloalkyl group or an aryl group.

As diazo components, besides ortho-nitraniline itself, 3-nitro-4-amino-1-methylbenzene, 3-nitro-4-amino-1-alkoxybenzenes, 3-nitro-4-aminobenzoic acid alkyl esters and 1-amino-2,4-dinitrobenzene may be mentioned by way of examples. Suitable coupling components are for example the 2.3-hydroxynaphthoyl compounds of methyl amine, ethyl amine, propyl amine, the butyl amines, the amyl amines, dimethyl amine, diethyl amine, dipropyl amine, diisoamyl amine, methylethyl amine, of N-methyl aniline, N-ethyl aniline, N-butyl aniline, ethylbenzyl amine, cyclohexyl amine as well as of the toluidines and xylidines containing an alkyl group containing up to 5 carbon atoms attached to the nitrogen atom.

The dyestuffs obtainable according to the present invention yield vivid yellow to blue-red dyeings which are distinguished by a good fastness to light. They are insoluble in water, but soluble in numerous organic solvents and therefore may be employed for coloring these solvents as well as lacquers, films and artificial masses prepared with the use of the said solvents.

The following examples will further illustrate how the said invention may be carried out in practice, but the invention is not restricted to these examples. The parts are by weight.

Example 1

A solution of the diazo compound of 138 parts of orthonitraniline is introduced, while stirring, into a solution of 250 parts of 2.3-hydroxynaphthoic acid diethylamide in an amount of dilute caustic soda solution necessary for neutralizing the acid used during the diazotization. The dyestuff thus obtained dyes cellulose ester lacquers very pure vivid orange-red shades of an excellent fastness to light.

Example 2

The diazo compound of 152 parts of 3-nitro-4-amino-1-methylbenzene is coupled with a solution of 250 parts of 2.3-hydroxynaphthoic acid dimethylamide in an amount of caustic soda solution necessary for the neutralization of the acid employed. The resulting dyestuff dyes lacquers beautiful fast orange shades.

A similar dyestuff is obtained by employing as the diazo component 3-nitro-4-amino-1-ethylbenzene.

Example 3

168 parts of 3-nitro-4-amino-1-methoxybenzene are diazotized and the diazo solution is allowed, while stirring, to flow into a solution of 320 parts of 2,3-hydroxynaphthoic acid n-butylanilide in a mixture of pyridine and ethanol, a blue-red dyestuff of good fastness being obtained.

A similar dyestuff is obtained by employing, instead of 3-nitro-4-amino-1-methoxybenzene, 3-nitro-4-amino-1-ethoxybenzene.

Example 4

A solution of the diazo compound of 138 parts of orthonitraniline is introduced, while stirring, into a solution of 260 parts of 2,3-hydroxynaphthoic acid isoamyl amide in an amount of caustic soda solution necessary for the neutralization of the acid, which latter solution is preferably mixed with from 20 to 30 parts of an emulsifying agent. The dyestuff obtained colors cellulose ester lacquers clear orange-red shades of an excellent fastness to light.

Dyestuffs of similar properties are obtained by employing, instead of the 2,3-hydroxynaphthoic acid isoamyl amide, the 2,3-hydroxynaphthoyl derivatives of ethyl amine, butyl amine, ethyl cyclohexyl amine or normal-amyl amine.

Example 5

210 parts of 3-nitro-2-aminobenzene-1-carboxylic acid ethyl ester are diazotized and the diazo compound is coupled with 230 parts of 2,3-hydroxynaphthoic acid methylethyl amide. The orange-yellow dyestuff thus obtained is very suitable for coloring nitrocellulose lacquers.

A similar dyestuff is obtained by employing 3-nitro-4-aminobenzene-1-carboxylic acid methyl ester as the diazo component.

Example 6

183 parts of 2,4-dinitro-1-aminobenzene are diazotized and the diazo compound is coupled with 260 parts of 2,3-hydroxynaphthoic acid normal-amyl amide. The dyestuff thus obtained colors nitrocellulose lacquers red shades.

If 2,4-dinitro-1-amino-6-methylbenzene is employed as the diazo component, a dyestuff having similar properties is obtained.

What we claim is:

1. Azo dyestuffs corresponding to the general formula

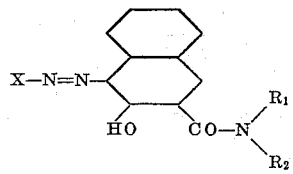

wherein X represents a radicle free from sulphonic and carboxylic acid groups which is selected from the group consisting of the radicles of nitrobenzene and nitrobenzene substituted by nitro, alkyl, alkoxy and esterified carboxylic acid groups, in which the radicle X is attached to the azo group in ortho-position to the nitro group, wherein $R_1$ stands for an alkyl radicle selected from the group consisting of aliphatic radicles containing up to 5 carbon atoms and cycloalkyl radicles, and wherein $R_2$ stands for a member of the group consisting of hydrogen and aliphatic radicles containing up to 5 carbon atoms.

2. Azo dyestuffs corresponding to the general formula

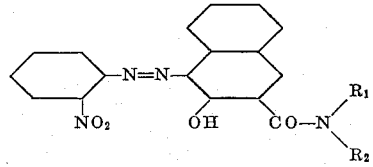

wherein $R_1$ stands for an alkyl radicle selected from the group consisting of aliphatic radicles containing up to 5 carbon atoms and cycloalkyl radicles, and wherein $R_2$ stands for a member of the group consisting of hydrogen and aliphatic radicles containing up to 5 carbon atoms.

3. Azo dyestuffs corresponding to the general formula

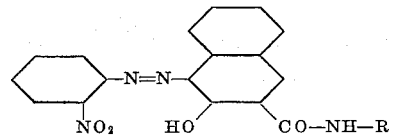

wherein R stands for an alkyl group containing up to 5 carbon atoms.

4. The azo dyestuff corresponding to the formula

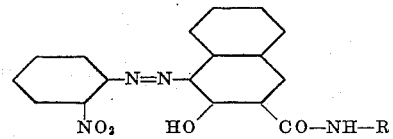

wherein R stands for an amyl group.

5. Azo dyestuffs corresponding to the general formula

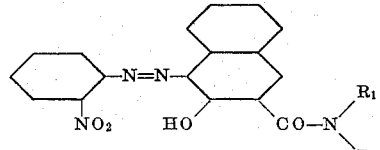

wherein $R_1$ and $R_2$ are equal or different alkyl groups containing up to 5 carbon atoms.

6. The azo dyestuff corresponding to the formula

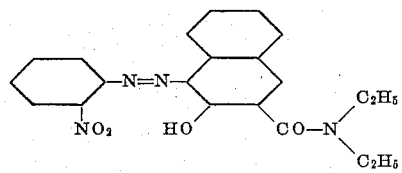

HANS KRZIKALLA.
BERND EISTERT.
JOACHIM MUELLER.
ALFRED THURM.